(12) United States Patent
Aitken

(10) Patent No.: US 6,277,775 B1
(45) Date of Patent: Aug. 21, 2001

(54) GEAS SULPHIDE GLASSES CONTAINING P

(75) Inventor: Bruce G. Aitken, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/491,053

(22) Filed: Jan. 25, 2000

Related U.S. Application Data

(60) Provisional application No. 60/116,610, filed on Jan. 21, 1999.

(51) Int. Cl.$^7$ .......................................... C03C 3/32
(52) U.S. Cl. ........................... 501/40; 428/426; 428/688; 501/40; 501/41; 501/44; 501/45; 501/904
(58) Field of Search ..................................... 428/426, 688; 501/40, 41, 43, 44, 45, 904

(56) References Cited

U.S. PATENT DOCUMENTS

| | | | |
|---|---|---|---|
| Re. 36,513 | * 1/2000 | Aitken et al. | 385/144 |
| 3,370,964 | 2/1968 | Hilton, Jr. et al. . | |
| 3,655,255 | 4/1972 | Krause et al. . | |
| 5,389,584 | 2/1995 | Aitken et al. . | |
| 5,629,248 | * 5/1997 | Aggarwal et al. | 501/40 |
| 6,066,417 | * 5/2000 | Cho et al. | 429/303 |

* cited by examiner

*Primary Examiner*—Deborah Jones
*Assistant Examiner*—Gwendolyn Blackwell-Rudasill
(74) *Attorney, Agent, or Firm*—Milton M. Peterson

(57) ABSTRACT

A GeAs sulphide glass family of transparent glasses having transmission far into the infrared portion of the spectrum, containing a source of phosphorus ion as a co-dopant to effect dispersion of a rare earth metal ion dopant in the glass, an optical component comprising the glass, and a method of dispersing a rare earth metal ion in the glass.

25 Claims, 3 Drawing Sheets

GeAs SULPHIDE GLASSES CONTAINING P

This application claims the benefit of U.S. Provisional Application, Ser. No. 60/116,610, filed Jan. 21, 1999 entitled GeAs SULPHIDE GLASSES CONTAINING P, by Bruce G. Aitken.

BACKGROUND OF THE INVENTION

U.S. Pat. No. 5,389,584 (Aitken et al.) describes stable glasses that exhibit excellent transmission far into the infrared region of the spectrum. These glasses consist essentially of, expressed in terms of mole % on the sulphide basis, 55–95% $GeS_2$, 2–40% $As_2S_3$, 0.01–20% $Ga_2S_3$, and/or $In_2S_3$ and 0–10% $MS_x$ wherein M is at least one modifying cation selected from the group consisting of Li, Na, K, Ag, Tl, Ca, Sr, Ba, Cd, Hg, Sn, Pb, Al, Sb, Y and rare earth metals of the lanthanide group, 0–20% Cl and/or F, 0–5% Se, and wherein the S and/or Se content can vary between 85 and 125% of the stoichiometric value.

When glasses having compositions within these ranges were doped with praseodymium ions ($Pr^{3+}$), it was found that the glasses exhibited strong $^1G_4$ fluorescence at 1.3 μm with a lifetime (τ) value of at least 300 μsec. However, this was only achieved if an effective amount of gallium and/or indium were present in the glass composition. These components served to disperse the $Pr^{3+}$ dopant, thereby avoiding the deleterious effect of concentration quenching. Otherwise, in a binary, arsenic germanium sulphide glass doped with $Pr^{3+}$ ions, the latter dopant was completely clustered and, therefore, the glass exhibited very weak fluorescence at 1.3 μm.

Such co-doped glasses have been shown to be particularly useful in the production of optical devices used in telecommunication. These devices include amplifiers, upconverters and lasers. The use is based on the fact that a rare earth dopant, such as the $Pr^{3+}$ ion, is well dispersed in a glass containing gallium and/or indium ions as co-dopants. As a consequence, fluorescence emanating from the rare earth metal dopant is not degraded by concentration quenching, or by similar, non-radiative, quenching processes.

The invention of the—584 patent was directed at improving the thermal stability of known, gallium sulphide glasses. Thermal stability is evidenced by the difference between the temperature at the onset of crystallization in a glass and the glass transition temperature ($T_x$-$T_g$). At the same time, the desirable transmission characteristics, and other properties, of the gallium sulphide glasses were maintained.

The invention, on which the patent was based, derived from two fundamental discoveries. First, it was found that increased concentrations of arsenic in gallium, germanium sulphide glasses imparted enhanced thermal stability to the glasses. Second, it was found that the presence of gallium (Ga) and/or indium (In) in the glass eliminated rare earth clustering, thereby assuring, in the case of Pr doping, that the fluorescence at 1300 nm was not quenched.

The present invention is based on the discovery of a co-dopant, other than Ga and/or In, that is equally as effective in dispersing a rare earth metal dopant. At the same time, other important advantages are effected.

It is a basic purpose, then, of the present invention, to provide such alternative co-dopant for the rare earth metal doped glasses of the—584 patent, while retaining the properties of those glasses.

It is a further purpose to provide an improved, co-doped glass for optical devices used in telecommunications.

It is a still further purpose to provide a co-dopant that will result in at least some increase in the phonon energy level that can be generated in the glass.

It is another purpose to provide a means of dispersing a rare earth metal dopant in a glass, thereby enhancing the effectiveness of the glass.

SUMMARY OF THE INVENTION

In part, the invention resides in a GeAs sulphide glass having composition ranges consisting essentially of, as calculated in mole % on a sulphide basis: 55–95% $GeS_2$, 0–40% $As_2S_3$ and/or $Sb_2S_3$, 0.01–25% $P_2S_5$, 0–15% $MS_x$ where M is one or more of the group consisting of Li, Na, K, Ag, Tl, Ca, Sr, Ba, Cd, Hg, Sn, Pb, B, Al, Si, Y, and a rare earth metal of the lanthanide series, 0–20% Cl and/or F, 0–5% Se and 0–5% O, the total S+Se content being between 75 and 130% of the stoichiometric value.

The invention further resides in an optical component composed of a GeAs sulphide glass having composition ranges consisting essentially of, as calculated in mole % on a sulphide basis: 55–95% $GeS_2$, 0–40% $As_2S_3$ and/or $Sb_2S_3$, 0.01–25% $P_2S_5$, 0–15% $MS_x$ where M is one or more of the group consisting of Li, Na, K, Ag, Tl, Ca, Sr, Ba, Cd, Hg, Sn, Pb, B, Al, Si, Y, and a rare earth metal of the lanthanide series, 0–20% Cl and/or F, 0–5% Se and 0–5% O, the total S+Se content being between 75 and 130% of the stoichiometric value.

The invention also contemplates a method of dispersing a rare earth metal ion in a GeAs sulphide base glass as a dopant, the method comprising including a source of phosphorus in the glass as a co-dopant.

DESCRIPTION OF THE INVENTION

Figure 1:
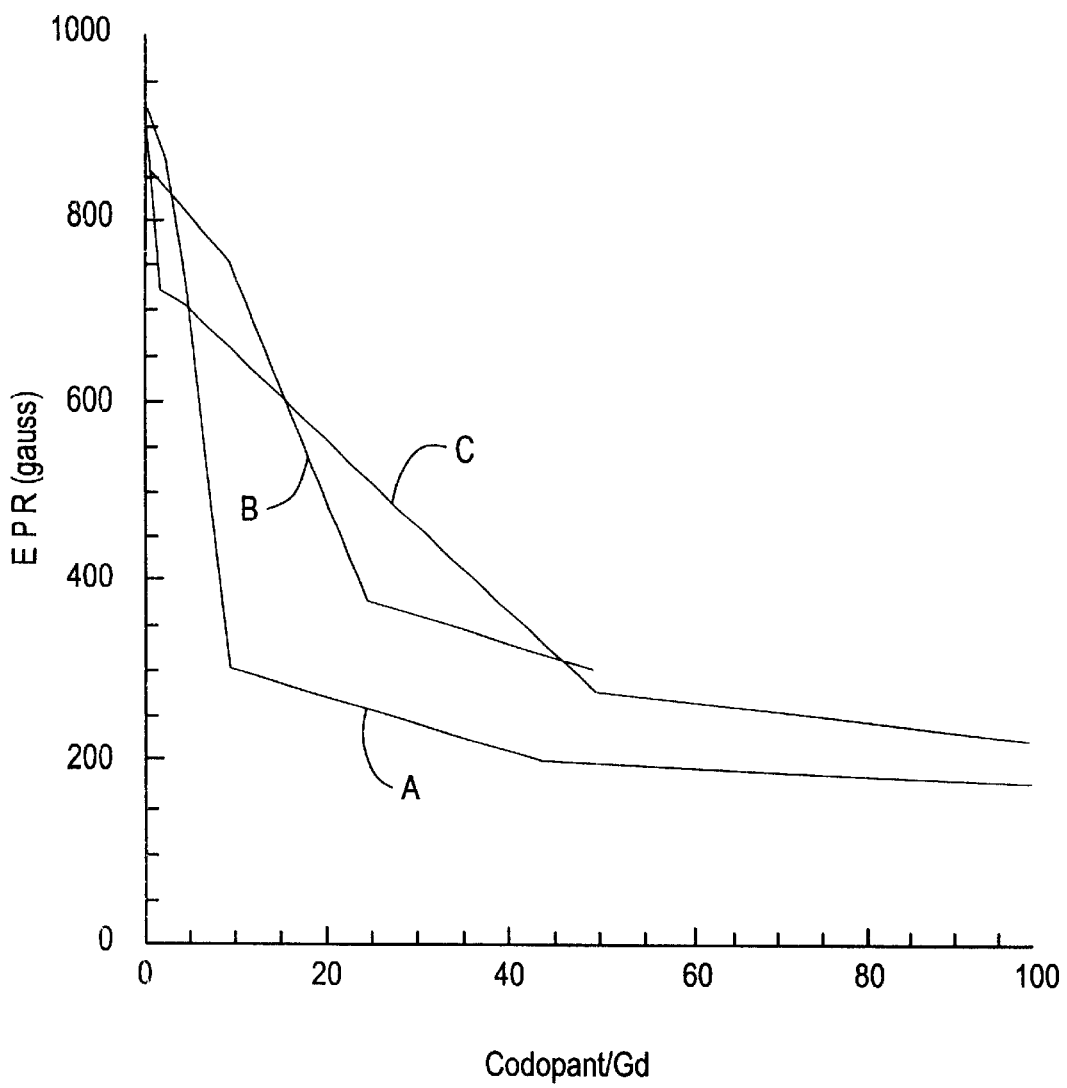
FIGS. 1 and 2 in the accompanying drawing are graphical representations, each illustrating a method of showing the manner in which clustering of a rare earth metal, dopant ion is decreased in accordance with the present invention.

The basic, GeAs sulphide, glass family of the present invention is essentially the same as that of the earlier—584 patent. There are small differences in the effective ranges of certain components, such as $As_2S_3$ and/or $Sb_2S_3$. However, these do not appreciably alter the transmission and the thermal stability characteristics described in the patent. Therefore, the teachings of the patent are incorporated herein in their entirety.

The essential distinction is based on discovery that phosphorus can be effectively employed as a co-dopant in the GeAs sulphide glasses. When substituted for Ga and/or In, phosphorus has essentially the same effect as these elements, insofar as dispersing a rare earth metal, dopant ion in the glass. This avoids the quenching effect that degrades fluorescence from the dopant, and that is the result of clustering of the rare earth metal ions in the glass.

The use of phosphorus as a co-dopant provides additional advantages as well. Gallium and indium have a tendency to redden the glass, that is, to red-shift the absorption edge of the glass. This shift of the absorption edge to longer wavelengths in the red portion of the spectrum tends to reduce light transmission. When such a glass, doped with $Pr^{3+}$ ions, is to be used to generate fluorescence at 1.3 μm, a significant amount of the requisite 1.0 μm pump power may be dissipated by host glass absorption, thereby degrading fluorescence efficiency.

In contrast, phosphorus produces a more yellow color, that is, a blue-shift of the absorption edge of the glass. This shift to shorter wavelengths in the blue portion of the spectrum tends to broaden the transparency window of the glass, thereby alleviating the problem.

The presence of phosphorus in the glass, an element relatively lighter in weight than the major glass constituents (Ge, As and S), results in an increase in the maximum phonon energy of the glass. When such a glass is doped with a rare earth metal, this characteristic can improve the efficiency of fluorescing transitions, particular those of 4-level systems where the lower laser level is an excited state. An increased maximum phonon energy can result in a more rapid depopulation of the spent ions to the ground state via nonradiative decay. In the case of a Pr-doped glass, for example, the more rapid depopulation occurs from the intermediate $^3H_5$ level of the $Pr^{3+}$ ion to the $^3H_4$ ground state.

The same effect can be achieved by including other compatible, network-forming elements into the glass composition that are lighter in weight than Ge, As and S. Such lighter weight elements include B, Al, Si and O. Aluminum is effective to the extent that it can be incorporated in the present glass compositions. However, aluminum is incorporated in the present glasses only with difficulty, thus limiting its utility. In general, in addition to P, Si and O are of greatest interest.

The light weight elements have the desirable effect of increasing the rate of ion depopulation at certain levels, for example, the indicated $^3H_5$ level of the $Pr^{3+}$ ion. At the same time, they may depopulate other fluorescent levels at a faster rate than desired. Accordingly, this situation may necessitate limiting the total content of the light weight elements other than P to not more than about 1% of the glass composition.

In the case of Pr doping, we have found that the lifetime of the technologically important 1300 nm fluorescence decreases rapidly from about 300 μs to about 100 μs as the P concentration rises to 1% or higher. This reduction in fluorescence lifetime corresponds to a drop in the quantum efficiency of the 1300 nm luminescence from about 60% to about 20%. This pronounced decrease in fluorescence lifetime and quantum efficiency is attributed to the fact that incorporation of P in these glasses gives rise to an increase in the maximum phonon energy (MPE), thereby resulting in an increased probability of nonradiative decay.

Specifically, for the case of P, the MPE is about 700 cm−1. This corresponds to a glass vibrational frequency that is associated with the stretching of a P=S double bond. It has been found that the MPE of P-containing glasses can be reduced to an intermediate value through the simultaneous incorporation of either Ga or In in the glass. These codopants react with P=S double bonds to form —Ga—S—P—S— or —In—S—P—S— units which vibrate at lower frequency. Ga and/or In, in a ratio of less than 1:1 with P, have some effect. However, where the ratio is less than 1:1, a degree of P=S double bonds remain, thereby markedly diminishing fluorescence. In contrast, where the ratio of Ga and/or In to P is at least 1:1, and preferably greater, the 1300 nm fluorescence lifetime is only reduced to about 200 μs. This corresponds to a useful quantum efficiency of about 40%, thus creating a decided preference for a Ga and/or In ratio to P of at least 1:1 or greater.

Since the gallium and indium elements are similar in weight to germanium, they have essentially no effect on phonon energy. Hence, they have essentially no effect on ion decay or depopulation at either the desired $^3H_5$ level or at other undesirable levels. Thus, an optimum level of P can be employed and supplemented with Ga or In where additional declustering is required. The optimum ratio of P to Pr is usually about 5:1.

Phosphorus tends to decrease chemical durability of a glass. Also, as will be seen later, only a relatively limited amount may be effective for dispersal purposes. Therefore, while up to 25% of the sulphide may be incorporated in the present glasses, its use may be limited by these factors.

The invention is further described with reference to FIGS. 1 and 2 in the accompanying drawings.

FIG. 1 in the accompanying drawing is a graphical representation showing the essential equivalence of P, In, or Ga as a dispersant to prevent clustering of rare earth metal ions in a GeAs sulfide glass. The plotted data were taken from a glass having the formula $Ge_{25}(As_{10-x}M_x)S_{65}$ wherein $M_x$ represents the amount of co-dopant in the glass. In the FIGURE, the ratios of co-dopant to gadolinium (Gd), as a dopant, are plotted on the horizontal axis. Line widths of electron paramagnetic resonance (EPR) in gauss, a measure of clustering, are plotted on the vertical axis.

Studies carried out with co-doped glasses have shown that electron paramagnetic resonance (EPR) provides a useful technique to ascertain whether a rare earth metal, ion dopant in a host glass is clustered or dispersed. It has been shown that the line width of the EPR resonance directly correlates with the degrees of clustering of the dopant ion, with broader EPR resonances indicating increased levels of clustering. In the FIGURE, the dopant ion is gadolinium (Gd).

Curves shown in FIG. 1 are based on plotted, EPR data measured on the GeAs sulphide glass doped with a fixed amount (500 ppm by weight) of Gd and varying amounts of the individual Ga, In and P co-dopants. Curve A is based on data with Ga as a co-dopant; Curve B with In as the co-dopant; Curve C with P as the co-dopant in accordance with the present invention. It will be noted that In and P are essentially equally effective in preventing clustering. Gallium is somewhat more effective at lower ratios, but the difference becomes less significant at higher ratios.

The plotted data indicate that the EPR line width of glasses co-doped with P drops steadily as the P concentration increases. As indicated earlier, this demonstrates that the rare earth metal dopant becomes increasingly dispersed as the P concentration increases.

Unfortunately, the EPR technique of measurement is not effective with all rare earth metal, dopant ions. For most other ions, such as $Pr^{3+}$, it is necessary to employ a measurement of fluorescent intensity. However, as will appear subsequently, the two methods of measurement correlate very well.

Figure 2:
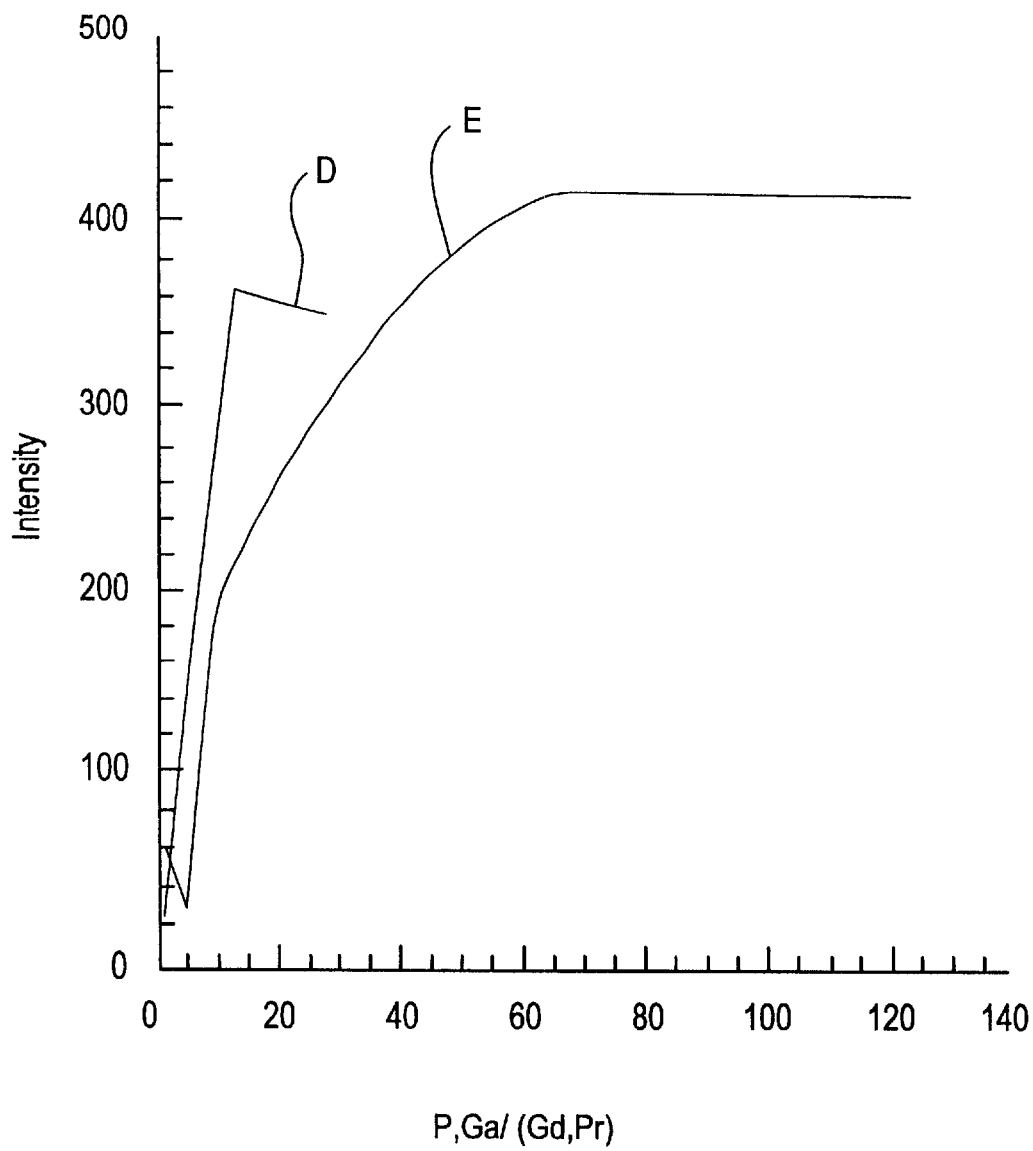

FIG. 2 is a graphical representation illustrating the prevention of clustering of rare earth metal ions as measured by fluorescent intensity. In FIG. 2, the ratio of co-dopant to dopant is plotted on the horizontal axis. The $^1D_2$ intensity, a measure of fluorescent intensity arising from the $^1D_2$ level of the $Pr^{+3}$ ion, is plotted on the vertical axis. In this measure, an increase in intensity signifies a decrease in clustering.

In FIG. 2, Curve D is the intensity curve for the base glass of FIG. 1 co-doped with Ga. Curve E is the intensity curve for the glass co-doped with phosphorus. The intensity curves move in the reverse of the EPR linewidth curves. Otherwise, they correspond closely in behavior.

In FIG. 1, the linewidth curves decrease rapidly to a co-dopant/dopant ratio of about 20:1, and then tend to flatten out. Likewise, in FIG. 2, the intensity curves increase rapidly to a co-dopant/dopant of about 20:1, and then level off. The similarity tends to confirm the validity of both forms of measurement.

It is apparent from the plotted data in FIGS. 1 and 2 that a ratio of co-dopant to dopant as low as 1:1 has a measurable effect that indicates a decrease in clustering. The effect becomes quite significant at a ratio of 5:1, and little practical benefit with regard to clustering is seen at ratios beyond about 20:1.

The invention is further described with reference to specific embodiments. It will be appreciated that these embodiments are intended only to be illustrative, not limiting.

TABLE I sets forth batch compositions in parts by weight for several glasses in accordance with the present invention. Batches 1–5 contain $Gd_2S_3$ as a rare earth metal dopant. Batches 6–14 contain praseodymium as a rare earth metal dopant.

TABLE II sets forth, in atomic %, glass compositions corresponding to the batches shown in TABLE I. Also shown are the ratio of phosphorus to rare earth metal ion dopant (P/Gd, Pr). Also shown are glass appearance; the EPR linewidth measured in gauss on glasses 1–5; the $^1D_2$ fluorescence intensity measured on glasses 6–10, the $^1G_4$ fluorescence lifetime measured in microseconds on glasses 6–12.

at 850°–950° C., the melts were quenched by inserting the hot ampoules in room temperature water. The homogeneous glass rods, thus formed, had diameters of about 7–10 mm and length of about 60–70 mm. These rods were annealed at about 325°–425° C.

For production purposes, the glass batches can be melted in larger melting units. It is necessary, however, to employ at least a partially evacuated, closed container as a melting vessel. This avoids volatilization, as well as air contact and consequent oxidizing of the batch materials.

The batch will produce a substantial vapor pressure during melting. The closed melting unit must be sufficiently evacuated to accommodate such vapor pressure without fracture. After an adequate time to achieve a homogeneous melt, the molten glass is cooled while still enclosed. This provides a solid body that may be reshaped as desired.

It is apparent that phosphorus is effective as a co-dopant in GeAs sulphide glasses to counter the tendency for rare earth metal ions to cluster and become ineffective. Thus, the glasses of the present invention, co-doped with phosphorus, find application in fabrication of the telecommunication equipment, such as amplifiers operating at 1.3 µm.

As noted earlier, the relatively light weight of the phosphorus provides a further advantage when used in such equipment. The lighter weight has the potential for alleviating a bottleneck that may occur in the optical transitions relevant to amplification at 1.3 µm.

TABLE I

| component | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Ge | 3.904 | 3.905 | 3.909 | 3.939 | 3.977 | 3.909 | 3.904 | 3.905 | 3.939 | 3.977 | 3.954 | 3.966 | 3.918 | 3.923 |
| As | 1.603 | 1.596 | 1.582 | 1.464 | 1.314 | 1.582 | 1.604 | 1.596 | 1.464 | 1.314 | — | — | 1.213 | 1.215 |
| S | 4.481 | 4.485 | 4.487 | 4.521 | 4.515 | 4.491 | 4.485 | 4.487 | 4.525 | 4.569 | 4.612 | 4.764 | 4.535 | 4.592 |
| $Gd_2S_3$ | 0.009 | 0.009 | 0.009 | 0.009 | 0.009 | — | — | — | — | — | 0.005 | 0.005 | 0.005 | 0.005 |
| Pr | — | — | — | — | — | 0.005 | 0.005 | 0.005 | 0.005 | 0.005 | 0.067 | 0.203 | 0.033 | 0.084 |
| P | 0.003 | 0.007 | 0.013 | 0.017 | 0.136 | 0.013 | 0.003 | 0.007 | 0.067 | 0.136 | 1.367 | 1.067 | 0.301 | 0.188 |

TABLE II

| component | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Ge | 25 | 25 | 25 | 25 | 25 | 25 | 25 | 25 | 25 | 25 | 25 | 25 | 25 | 25 |
| As | 9.95 | 9.9 | 9.8 | 9 | 8 | 9.8 | 9.95 | 9.9 | 9 | 8 | — | — | 7.5 | 7.5 |
| S | 65 | 65 | 65 | 65 | 65 | 65 | 65 | 65 | 65 | 65 | 66 | 68 | 65.5 | 66.25 |
| P | 0.05 | 0.1 | 0.2 | 1 | 2 | 0.2 | 0.05 | 0.1 | 1 | 2 | 1 | 3 | 0.5 | 1.25 |
| Ga | — | — | — | — | — | — | — | — | — | 9 | 7 | 2 | 1.25 | — |
| P/Gd | 2.18 | 5.08 | 9.43 | 48.6 | 98.6 | — | — | — | — | — | — | — | — | — |
| P/Pr | — | — | — | — | — | 11.8 | 2.73 | 6.37 | 61.0 | 123.7 | — | — | 33.6 | 85.4 |
| Color | Clear | Clear | Clear | Clear | Clear | Clear | Clear Amber | Clear Dark Amber | Clear Amber | Clear Amber-orange | Clear Yellow | Clear Yellow | — | — |
| EPR linewidth | 725 | 705 | 661 | 279 | 225 | — | — | — | — | — | — | — | — | — |
| $^1D_2$ Intensity | — | — | — | — | — | 10 | 3 | 1.5 | 20 | 20 | — | — | — | — |
| $^1G_4$ Intensity | — | — | — | — | — | 99 | 123 | 109 | 94 | 93 | 200 | 190 | — | — |

Glass batches shown in TABLE I were typically prepared by mixing the respective elements in an evacuated, fused-silica container. While batches based on the elements are preferred, metal sulphide, selenide or halide can be employed. For example, Gd was added as $Gd_2S_3$ in batches 1–5.

The batch constituents were compounded and sealed into silica ampoules which had been evacuated to about $10^{-5}$ to $10^{-6}$ Torr. The ampoules were sealed, and then placed into a furnace designed to impart a rocking motion to the batch during melting. After melting the batch for about 1 to 2 days In a glass doped with $Pr^{-3+}$ ions, such amplification process involves pumping the $Pr^{-3+}$ ions from the $^3H_4$ ground level to the $^1G_4$ lasing level where fluorescence at 1.3 µm occurs as desired for amplification. Such fluorescence results in decay to the $^3H_5$ level. Non-radiative decay to the ground level then depopulates the $^3H_5$ level, but may not occur rapidly enough.

Due to the low phonon energy of GeAs sulphide glasses, non-radiative decay from the intermediate $^3H_5$ level to the ground state may not occur at a rate sufficient to depopulate the $^3H_5$ level as rapidly as is desired. The greater phonon energy supplied by the lighter weight phosphorus tends to enhance the rate of decay, and thus the rate of depopulation of ions.

Figure 3:
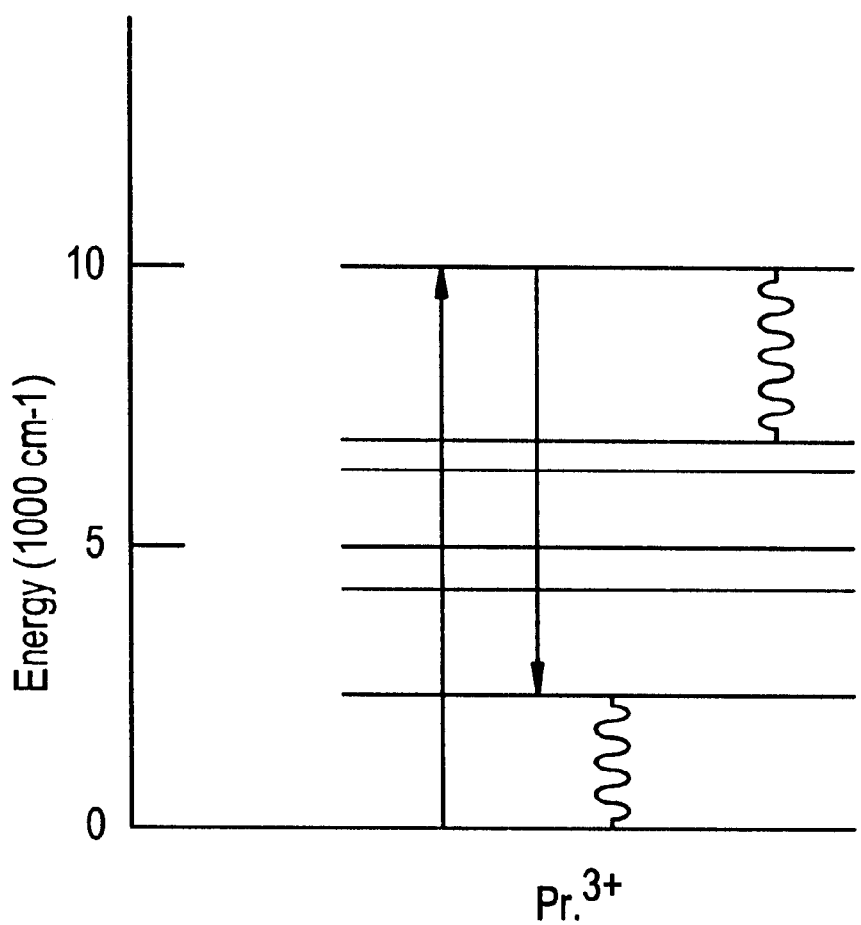
FIG. 3 is a graphical representation illustrating an amplifying process involving a $Pr^{3+}$ ion.

FIG. 3 is a graphical representation of the amplifying process described above. FIG. 3 depicts significant energy levels in pumping and decay of the $Pr^{3+}$ ion in the process of amplifying 1.3 µm radiation.

The several horizontal lines in FIG. 3 represent significant energy levels of the $Pr^{3+}$ ion for present purposes. Initially, ions are pumped from the $^3H_4$ ground level to the $^1G_4$ lasing level as indicated by the vertical arrow between these levels. From the $^1G_4$ level, the ions emit 1.3 µm amplifying radiation and fall to the $^3H_5$ level, as indicated by the downwardly pointed, vertical arrow.

Due to the low phonon energy of the GeAs sulfide glass, there is little tendency for excited ions to decay nonradiatively to the intermediate $^3F_4$ level (as indicated by the wavy line between the latter and the $^1G_4$ level). This is an undesirable process that quenches 1.3 µm fluorescence, for example, in Pr-doped oxide glasses. However, there is a tendency for the ions to accumulate at the $^3H_5$ level before undergoing final decay to the $^3H_4$ ground level. This final non-radiative decay is indicated by a wavy line between the $^3H_5$ and $^3H_4$ levels.

The tendency to accumulate at the $^3H_5$ level is undesirable because, due to energy mismatch, a subsequent pumping action at 1.0 µm cannot raise the accumulated ions back to the $^1G_4$ level and, thus, 1.3 µm fluorescence from these ions is quenched.

The invention has been illustratively described with reference to praseodymium and gadolinium as rare earth metal dopants. It will be appreciated, however, that it is applicable to other rare earth metal dopants as well. This includes those in a group between and including lanthanum and lutetium in the Periodic Table. The content of a dopant ion will generally range from 0.005–1.0 wt. %.

I claim:

1. A family of transparent, GeAs sulphide glasses that exhibits excellent transmission far into the infrared portion of the spectrum, and that has composition ranges, as calculated in mole % on a sulphide basis, that consist essentially of: 55–95% $GeS_2$, 0–40% $As_2S_3$ and/or $Sb_2S_3$, 0.01–25% $P_2S_5$, 0–15% $MS_x$ where M is one or more of the group consisting of Li, Na, K, Ag, Tl, Ca, Sr, Ba, Cd, Hg, Sn, Pb, B, Al, Si, Y and a rare earth metal of the lanthanide series, 0–20% Cl and/or F, 0–5% Se, and 0–5% O, the total S and/or Se content being between 75 and 130% of the stoichiometric value.

2. A family of glasses in accordance with claim 1 wherein the glasses additionally contain 0–25 mole % of a sulfide selected from the group consisting of $Ga_2S_3$, $In_2S_3$ and mixtures thereof, the total content of P, Ga and In sulfides not exceeding 25 mole %.

3. A family of glasses in accordance with claim 2 wherein $Ga_2S_3$ is the selected additional sulfide.

4. A family of glasses in accordance with claim 2 wherein the ratio of Ga and/or In to P is 1:1 or greater.

5. A GeAs sulphide glass in accordance with claim 1 wherein the glass composition contains, as a dopant, a rare earth metal ion selected from the group between and including lanthanum and lutetium.

6. A GeAs sulphide glass in accordance with claim 5 wherein the content of the rare earth metal ion dopant is in the range of 0.005–1.0 wt. %.

7. A GeAs sulphide glass in accordance with claim 5 wherein the rare earth metal ion dopant is praseodymium.

8. A GeAs sulphide glass in accordance with claim 1 which contains, in addition to P, an element lighter than Ge, As and S.

9. A GeAs sulphide glass in accordance with claim 8 which contains at least one element selected from B, Si, Al and O.

10. A GeAs sulfide glass in accordance with claim 9 wherein the total content of P and selected element(s) is not over about 1%.

11. A GeAs sulphide glass in accordance with claim 2 wherein the ratio of the P ion to the rare earth metal ion is at least 1:1.

12. A GeAs sulfide glass in accordance with claim 11 wherein the ratio is at least 5:1.

13. A GeAs sulfide glass in accordance with claim 12 wherein the ratio is at least about 20:1.

14. An optical component composed of a GeAs sulphide glass that exhibits excellent transmission far into the infrared portion of the spectrum and that has composition ranges, as calculated in mole % on a sulphide basis, that consist essentially of: 55–95% $GeS_2$, 0–40% $As_2S_3$ and/or $Sb_2S_3$, 0.01–25% $P_2S_5$, 0–15% $MS_x$ where M is one or more of the group consisting of Li, Na, K, Ag, Tl, Ca, Sr, Ba, Cd, Hg, Sn, Pb, B, Al, Si, Y and a rare earth metal of the lanthanide series, 0–20% Cl and/or F, 0–5% Se, and 0–5% O, the total S and/or Se content being between 75 and 130% of the stoichiometric value.

15. An optical component in accordance with claim 14 wherein the GeAs sulfide glass additionally contains 0–25 mole % of a sulfide selected from the group consisting of $Ga_2S_3$, $In_2S_3$ and mixtures thereof, the total content of P, Ga and In sulfides not exceeding 25 mole %.

16. An optical component in accordance with claim 15 wherein the ratio of Ga and/or In to P is 1:1 or greater.

17. An optical component in accordance with claim 14 wherein the GeAs sulphide glass is doped with a rare earth metal ion selected from the group between and including lanthanum and lutetium.

18. An optical component in accordance with claim 15 wherein the ratio of the co-dopant, phosphorus ion to the rare earth metal ion is at least about 5:1.

19. An optical component in accordance with claim 14 wherein the component is an amplifier that fluoresces at a 1.3 µm wavelength, and the glass is a Pr-doped glass that contains, in addition to P, an element lighter than Ge, As, and S, whereby the phonon energy of the glass is increased and the ratio of optical transition from an intermediate $^3H_5$ level to ground level is thereby increased.

20. An optical component in accordance with claim 19 wherein the lighter weight element is one or more of B, Al, Si and O.

21. A method of dispersing a rare earth metal ion in a GeAs sulphide base glass as a dopant which comprises including a source of phosphorus in the glass as a co-dopant.

22. A method in accordance with claim 21 which comprises including the source of phosphorus in a GeAs sulfide glass additionally containing 0–25 mole % of a sulfide selected from the group consisting of $Ga_2S_3$, $In_2S_3$ and mixtures thereof, the total content of P, Ga and In sulfides not exceeding about 25 mole %.

23. A method in accordance with claim 22 wherein the ratio of Ga and/or In to P is 1:1 or greater.

24. A method in accordance with claim 21 which comprises including a source of P in an amount such that the ratio of P to rare earth metal ion is at least about 5:1.

25. A method in accordance with claim 21 which comprises including a source of P ion in the glass in such amount that the line width of the EPR resonance of the glass is less than 500 gauss, or the fluorescent intensity is greater than about 250.

* * * * *